US005574951A

United States Patent [19]
Sawyer et al.

[11] Patent Number: 5,574,951
[45] Date of Patent: Nov. 12, 1996

[54] SYSTEM FOR PROVIDING A TIME DIVISION RANDOM ACCESS INCLUDING A HIGH SPEED UNIDIRECTIONAL BUS AND A PLURALITY OF FUNCTION CARDS CONNECTED IN A DAISY CHAIN

[75] Inventors: Laurence D. Sawyer, Park City; Robert A. Lindsay, Bountiful; Steven C. Tate, Manti; Daniel M. Griffin, Bontiful, all of Utah

[73] Assignee: Unisys Corporation, Blue Bell, Pa.

[21] Appl. No.: 32,576

[22] Filed: Mar. 17, 1993

[51] Int. Cl.$^6$ .......................... G06F 13/00; G06F 13/20
[52] U.S. Cl. .................... 395/865; 395/856; 395/860; 364/842; 364/228; 364/231.5; 364/241.1
[58] Field of Search ..................... 395/275, 500, 395/865, 856, 860; 340/825.52; 370/16

[56] References Cited

U.S. PATENT DOCUMENTS

| | | | |
|---|---|---|---|
| 3,761,894 | 9/1973 | Pile et al. | 340/172.5 |
| 4,298,979 | 11/1981 | Dobyns et al. | 370/104 |
| 4,630,264 | 12/1986 | Wah et al. | 370/85 |
| 4,779,088 | 10/1988 | Restrepo | 340/825.5 |
| 4,833,605 | 5/1989 | Terada et al. | 364/200 |
| 4,847,757 | 7/1989 | Smith | 364/200 |
| 5,115,235 | 5/1992 | Oliver | 340/825.52 |
| 5,191,578 | 3/1993 | Lee | 370/63 |

*Primary Examiner*—Thomas C. Lee
*Assistant Examiner*—Rehana Perveen Krick
*Attorney, Agent, or Firm*—John B. Sowell; Mark T. Starr; Thomas J. Scott

[57] ABSTRACT

A novel high speed unidirectional bus system is provided for receiving a plurality of novel circuit card assemblies in receptacles on the bus. Adjacent receptacles are connected by lines on the bus which interconnect output pins to input pins. The circuit between output pins and input pins are formed by connecting the plugs on circuit card assemblies into the receptacles on said bus. The system comprises a plurality of function circuit card assemblies connected in a daisy chain when inserted into adjacent receptacles on said bus between a source circuit card assembly and a destination circuit card assembly and the address portion of the information supplied by the source circuit card assembly is programmed to identify the function circuit card assembly to first receive the source data whereby the unidirectional bus system may be operated in a time division random access mode at data rates in excess of the data rates of individual functional circuit card assemblies.

13 Claims, 7 Drawing Sheets

| EVENT | TIME | REMARKS |
|---|---|---|
| NUL | 1 | |
| NUL | 2 | |
| NUL | 3+ | TYPICAL IDLE BUS 72 |
| NUL | 4+ | |
| NUL | 5+ | |
| DESTINATION ADDR 1 | 6 | |
| DESTINATION ADDR 2 | 7 | TYPICAL INPUT FROM SOURCE |
| DESTINATION ADDR 3 | 8 | |
| DESTINATION ADDR 4 | 9 | |
| NUL | 10 | |
| NUL | 11+ | IDLE TIME |
| NUL | 12+ | |
| NUL | 13+ | |
| DESTINATION ADDR 1 | 14 | |
| DESTINATION ADDR 2 | 15 | |
| NUL | 16 | |
| DESTINATION ADDR 3 | 17 | TYPICAL DISCONTINUOUS DATA FROM SOURCE |
| NUL | 18 | |
| DESTINATION ADDR 4 | 19 | |
| NUL | 20 | |
| NUL | 21+ | |
| NUL | 22+ | |
| DESTINATION ADDR 1 | 23 | |
| DESTINATION ADDR 4 | 24 | TYPICAL NON SEQUENTIAL DATA FROM SOURCE |
| DESTINATION ADDR 2 | 25 | |
| DESTINATION ADDR 3 | 26 | |
| NUL | 27 | |
| NUL | 28+ | |
| NUL | 29+ | IDLE TIME |
| NUL | 30+ | |
| DESTINATION ADDR 1 | 31 | TYPICAL DATA FOR PARALLEL OPERATION OR DATA FROM OR TO ALTERNATIVE SOURCE/SINK |
| DESTINATION ADDR V | 32 | |
| DESTINATION ADDR 2 | 33 | |
| DESTINATION ADDR 3 | 34 | |
| DESTINATION ADDR W | 35 | |
| DESTINATION ADDR 4 | 36 | |
| DESTINATION ADDR Y | 37 | |
| NUL | 38 | |
| | 39 | |

FIG. 6

SYSTEM FOR PROVIDING A TIME DIVISION RANDOM ACCESS INCLUDING A HIGH SPEED UNIDIRECTIONAL BUS AND A PLURALITY OF FUNCTION CARDS CONNECTED IN A DAISY CHAIN

RELATED APPLICATIONS

The present application is related to our U.S. application Ser. No. 08/032,574, filed Mar. 17, 1993 for a STATION INTERFACE UNIT, now U.S. Pat. No. 5,339,312.

BACKGROUND OF THE INVENTION

1. Field of the Invention

The present application relates to flexible modular processing systems. More particularly, the present invention relates to a modular random access modified time division multiple access (TDMA) processing system having a TDMA bus and a bus master's systems bus which interconnects a plurality of novel circuit card assemblies (CCAs) having novel interfaces to form a flexible modular distributed processing system.

2. Description of the Prior Art

Heretofore, mainframe computing systems have employed different types of bus structures. Many mainframe computers employ systems or main buses wherein the bus is under control of one user and all of the users of the bus are blocked from using the system bus until the user completes his task. Such system buses are commercially available with standard interface units and protocol to enable designers of custom equipment to interconnect processing systems to a plurality of functional units which carry out predetermined task and to communicate with each other under control of the central processing system (CPU).

A popular commercially available systems bus is sold by Motorola and other vendors under the name Versa Modular European (VME) and VME-2 Bus Systems. This bus structure is combined with VME interface units to permit CPUs, microprocessors and functional units on Circuit Card Assemblies (CCA's) to seize control of the VME systems bus and transmit information to other assemblies on the bus until the bus master controlling the bus relinquishes control to another bus master designated user on the bus.

Since the VME or systems bus by definition operates as a shared bus system, the speed of operation of the processing system connected thereto is somewhat limited.

It is well known to employ Time Division Multiple Access (TDMA) concepts on a data bus. A predetermined number of unique time slots or divisions are established, at least one for each card of functional unit on the bus. Each functional unit has its turn to effectively become bus master during its time slot division whether or not the time slot is to be utilized.

In many processing systems some functional units operate as slave units and seldom need access to the TDMA bus, thus, a large number of time slots are wasted with conventional TDMA bus systems. Another disadvantage of TDMA bus systems is that a change in the number of cards or functional elements on the system may requires a change in the number of predetermined time slots which require a change in the software protocol.

Heretofore CCA's have been connected to systems buses for connection to a CPU in a distributed processing system and connected to each other directly through some form of compatible interface with the use of ribbon cables to provide a path for data that would be too slow for proper use on a systems (VME) bus or to avoid having to write software to replace the data path on the systems bus.

It would be desirable to eliminate the need for ribbon cables and/or custom mother boards used to provide direct paths between CCA's and to provide a modified TDMA bus system which virtually eliminates the waste of time slots and conventional TDMA bus protocol systems and to provide a highly flexible modular bus system which permits the change of position of CCA's in a high speed processing system without a change in protocol or software.

SUMMARY OF THE INVENTION

It is a primary object of the present invention to provide a novel random access time division multiple access (TDMA) bus system combined with a plurality of novel circuit card assemblies (CCA's) to provide a modular flexible high speed processing system for processing large amounts of data at high speeds.

It is a primary object of the present invention to provide a novel daisy chain bus for use with a novel modified TDMA bus system.

It is a primary object of the present invention to provide a novel daisy chain strip line bus which has a broader band width than a systems bus of similar strip line design.

It is a primary object of the present invention to provide a novel modified TDMA bus system which does not employ predetermined fixed time slots so as to greatly enhance the utilization factor of the TDMA bus.

It is another object of the present invention to eliminate the need for CCA point to point connections formerly provided by ribbon cables and/or custom mother boards.

It is another object of the present invention to provide a fast acting low level logic interface for CCA's and functional units on CCA's for a modified TDMA bus system.

It is another object of the present invention to provide a novel high speed modular expandable high speed bus system employing a modified TDMA bus on a systems bus for interconnecting CCA's into a multiprocessing system.

It is another object of the present invention to provide a novel bus system capable of transmitting image data in excess of 120 mega words per second.

It is another object of the present invention to provide a novel high speed bus capable of accepting standard pin format line replaceable units (LRU's) circuit card assemblies (CCA's) or individual functional elements and connect them into a system for high speed operation.

It is another object of the present invention to provide a novel interface unit for a bus system and for CCA's which permits series or parallel operation of functional units.

According to these and other objects of the present invention there is provided a novel high speed unidirectional bus for receiving and connecting a plurality of novel circuit card assemblies (CCA's) into a novel random access modified time division multiple access system (TDRA). Each CCA is provided with novel high speed logic interface receivers and transmitters for connecting the CCA's into a modular expandable daisy chain system. Said CCA's are provided with functional elements with input and output ports which are connectible one to another by the novel high speed logic interface transmitters and receivers to implement series or parallel connection of functional elements without changing the high speed unidirectional bus. Said CCA's are further provided with standard system bus interface connec-

BRIEF DESCRIPTION OF THE DRAWINGS

FIG. 3 comprising

DESCRIPTION OF A PREFERRED EMBODIMENT

Figure 1:
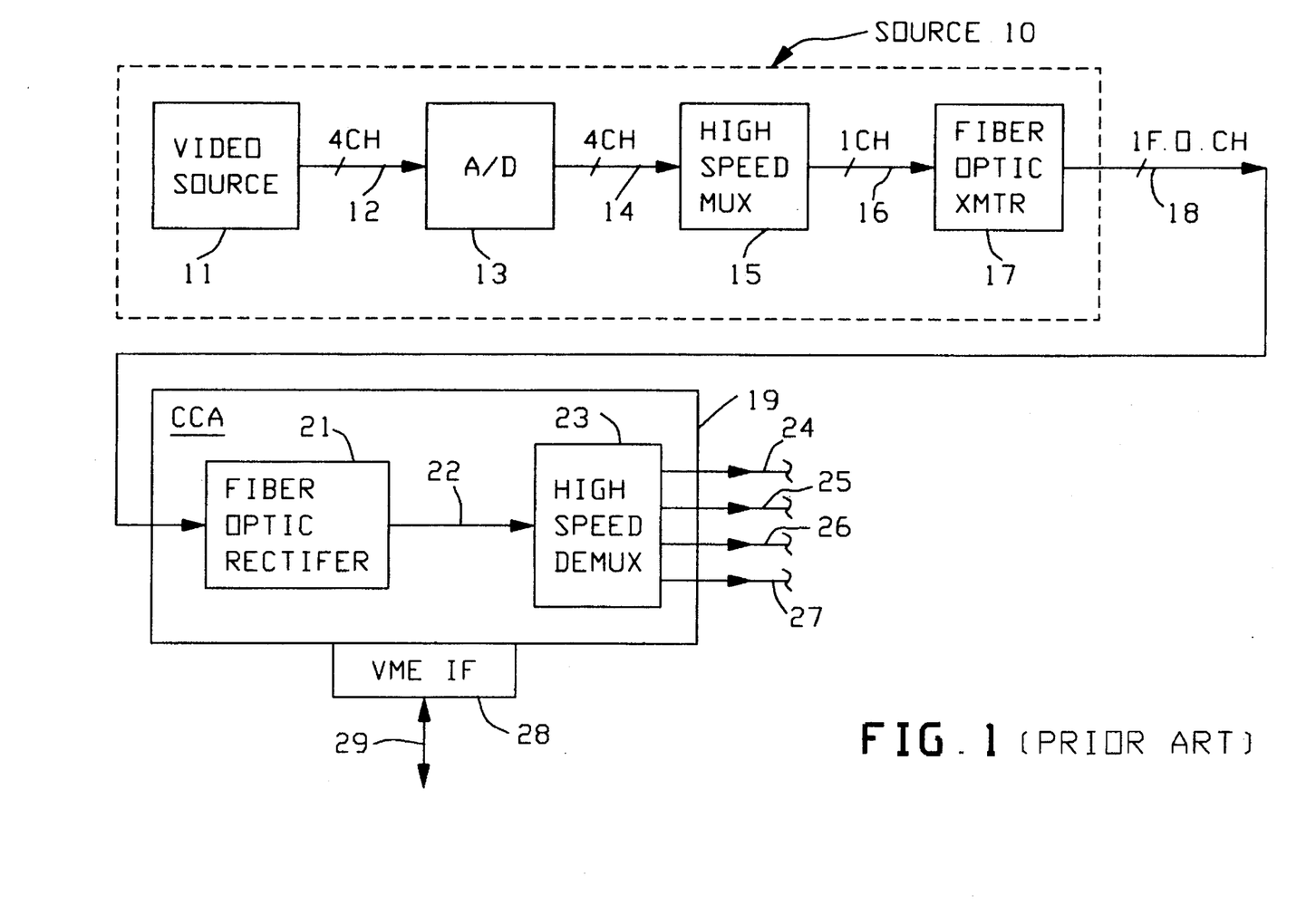
FIG. 1 is a block diagram of a prior art high speed data source and a high speed data interface.

Refer now to FIG. 1 showing a block diagram of a high speed data source 10 which comprises typically a video source 11 such as a video camera or information generated by a radar system. In the prior art system being described the video information from the video source 11 is divided into 4 subchannels 12 and applied to an analogue digital converter 13 to produce 4 channels of digital information on channels 14 which are inputted into a high speed multiplexor 15 so as to combine the 4 channels of information into a single high speed channel 16 which could be implemented in positive ECL logic. The information on channel 16 is applied to a fiber optic transmitter 17 to produce a output stream on fiber optic cable 18 which is capable of accepting and transmitting information at 1 gigahertz (1 gigabyte) data rates. AT&T provides a similar interface under the name of "Sonet" which operates at 2.488 gigabytes whereas the aforementioned fiber optic channel operates at 1.0625 gigabytes.

The fiber optic channel 18 is capable of transmitting information at distances up to 25 kilometers, however, in the present illustration the high speed data interface 19 is preferably located within 20 feet of the source 10. The high speed data interface 19 comprises a fiber optic receiver 21 coupled by a single high speed channel 22 to a high speed demultiplexor 23 to provide for independent discrete channels 24 to 27 which reproduce the digital information on channel 14.

It will be noted that the data source 10 is separate and independent from the high speed interface 19 which is mounted on a circuit card assembly. The circuit card assembly 19 is also provided with a systems bus or VME bus interface 28 which is connected to a processing system by the connection 29. All of the blocks shown in prior art FIG. 1 are commercially available from vendors such as Triquent, Inc., Finisar Corp., Vitesse and others.

Figure 2:
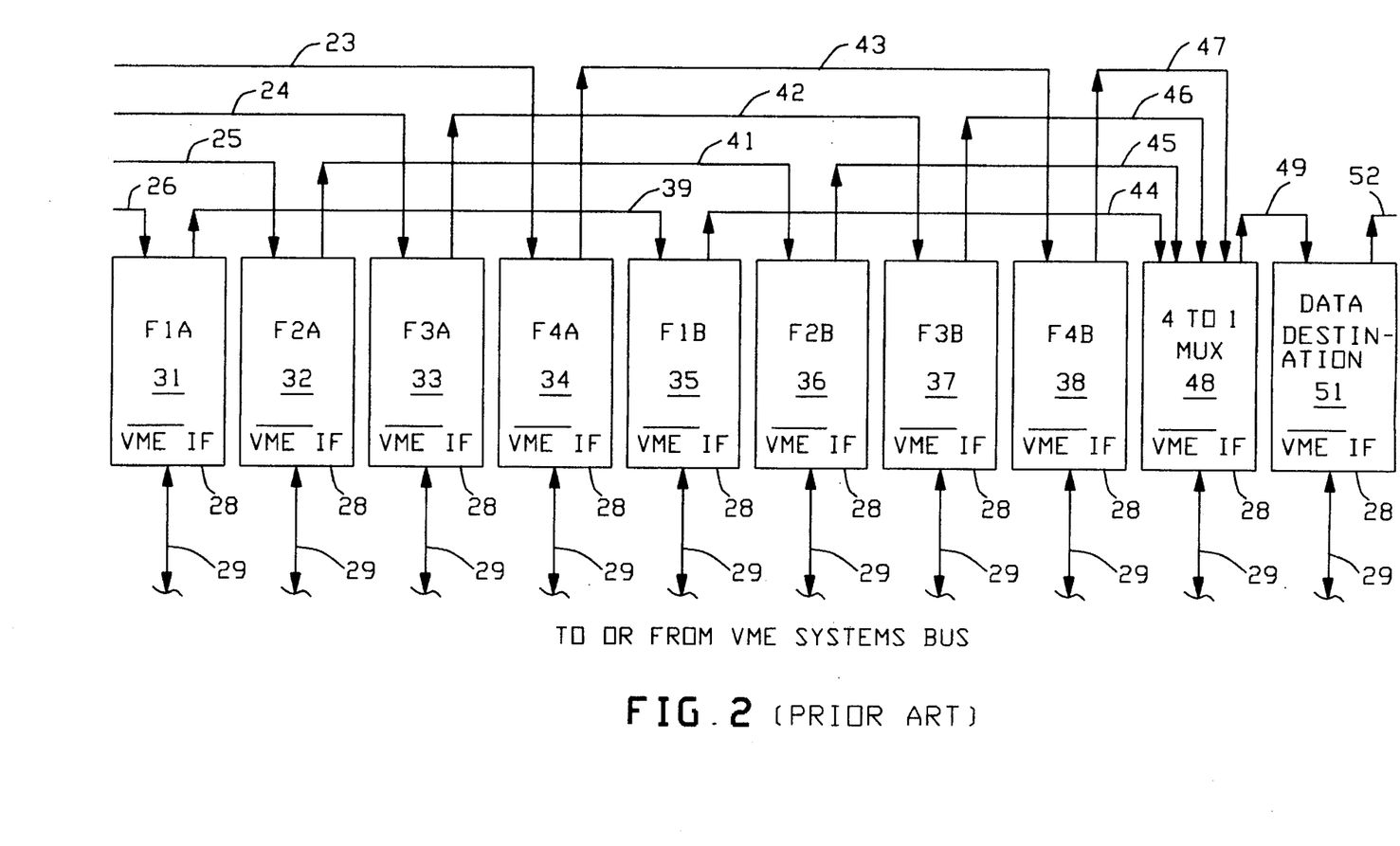
FIG. 2 is a block diagram of a prior art function portion of a high speed processing system for processing data generated at the interface of FIG. 1.

Refer now to FIG. 2 showing a block diagram of the functional portion of a high speed processing system for processing the data generated at the interface 19 of FIG. 1.

The information from interface 19 is connected via ribbon cables 23 to 26 to a plurality of functional elements 31 to 34 also shown as F1A to F4A. Typically such functional elements perform sequencing and formatting operations for preparing the digital information for processing in functional elements 35 to 38 also shown as F1B to F4B. The information formatted in functional element 31 is passed by ribbon cable 39 to processing element 35 in similar manner the information formatted in functional elements 32 to 34 is connected by ribbon cables 41 to 43 to the processing elements 36 to 38 as shown. It will be noted that the functional elements 31 to 34 and the processing elements 35 to 38 are operating in a parallel mode of operation. The processing elements 35 to 38 are shown connected by ribbon cables 44 to 47 to a four-to-one multiplexor 48 which is provided with an output ribbon cable 49 connected to data destination device 51. Typically data destination device 51 may be a gateway to a data link (not shown). In the example shown the line or cable 52 is typically a ribbon cable, however, it could be implemented in other forms of cables. It will be noted that the information processed in elements 35 to 38 is combined into a single channel 49 but was compressed four to one in the processing operation thus when multiplexed into a single channel is still at approximately the same frequency as the frequency on ribbon cables 39 to 43.

The prior art functional elements 31 to 38 were implemented as circuit card assemblies (CCA's) and are provided with VME system bus interfaces 28 and connectors 29 as shown.

Figure 3A:
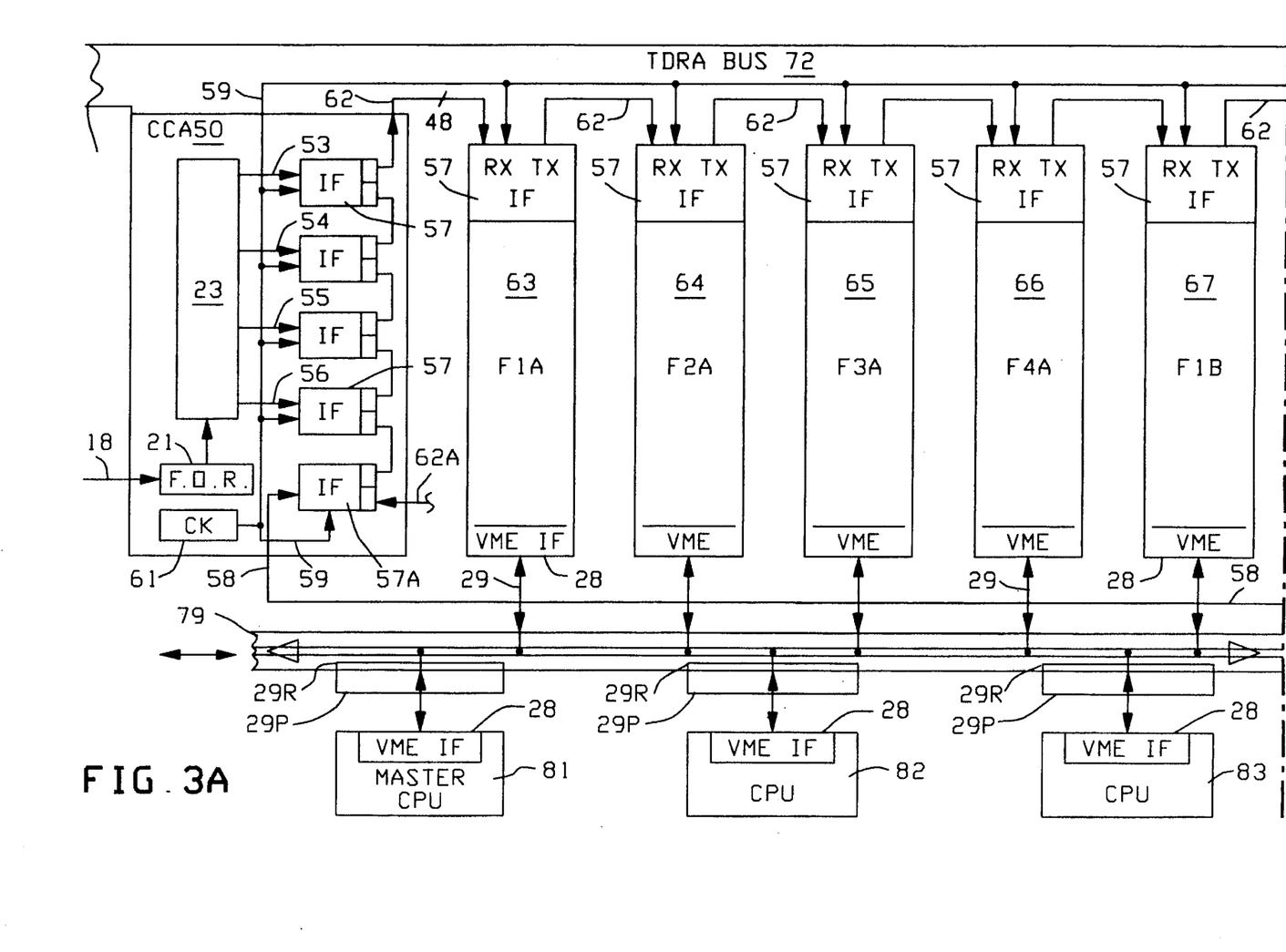
FIGS. 3A and 3B is a block diagram of the preferred embodiment of the present invention high speed multiprocessing system for processing data generated by a high speed data source such as the data source shown in FIG. 1.
Figure 3B:
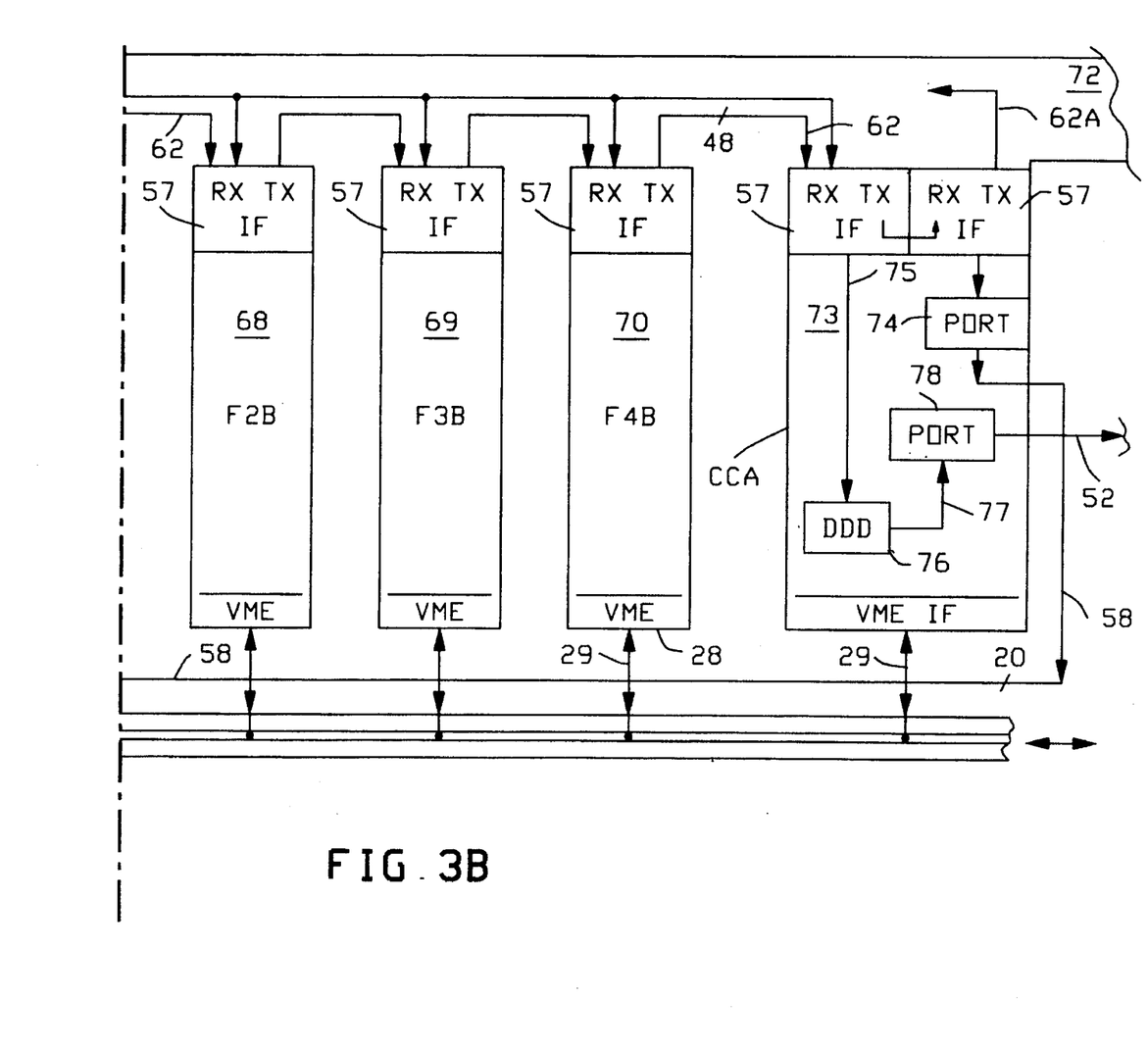

Refer now to FIG. 3 showing a block diagram of the preferred embodiment of the present invention high speed multiprocessing system for processing data generated by a high speed data source. For the purpose of illustrating the present invention the information on fiber optic cable 18 which may be as high as 2.488 gigabyte is shown being presented to a fiber optic receiver 21 which is coupled to a high speed demultiplexor 23 similar or identical to that shown in FIG. 1. The output from high speed demultiplexor 23 on printed circuit strip lines 53 to 56 are connected to a plurality of individual novel interface units 57 as shown. A fifth interface unit 57A is shown having a feedback input 58 and a clock input 59 from the systems clock 61. The systems clock on line 59 is a differential clock input which in the preferred embodiment operates at 172 megahertz and is routed into the bottom interface 57 of CCA 50 and is routed in parallel to all of the other interface units 57 via line 59. The 24 differential bits on line 62 result from 20 bits presented on lines 53 to 56 plus 4 bits which are programmed internal to the IF's 57 from the systems bus to be described in more detail hereinafter. Each of the interface units 57 have unidirectional receivers and transmitters for connecting one to another to be described in greater detail. The same interface unit 57 is shown provided on the functional elements 63 to 70 which are interconnected in a daisy chain by identical strip line interconnections 62 on the novel TDRA bus 72. The last card or element in the daisy chain is shown as a data destination device 73 having 2 of the novel interface units 57 connected in a daisy chain to permit the output of the last interface to be connected to the input of a port 74 which serves as a feedback via line 58 having 20 bits of information thereon that is connected to the interface unit 57A. Alternatively a full band width feedback path may be provided by coupling line 62A from transmitter 57D back to the receiver on IF 57A of CCA 50. It will be understood that this alternative line 62A may be incorporated into TDRA bus 72.

It will be understood that the 48 bits of information on line 62 which is inputted to the receiver side of the input interface 57 of the data destination device 73 diverts a portion of the information via internal line 75 to the input of the destination device function element 76 which has an output 77 connected to an output port 78 which provides the output information on a data link interface line 52 of the type shown and described in FIG. 2.

In order to better describe the present invention the functional element cards and CCA's are shown in FIG. 3 as 10 separate CCA's. In the preferred embodiment of the present invention it is possible to provide in a single CCA up to 6 interface units 57 which will support up to 6 independent functions, thus, the independent functions F1A to F4A may easily be placed on a single CCA and the functional elements F1B to F4B may easily be placed on a single CCA as will be described in greater detail hereinafter.

Each of the 10 CCA's and functional elements shown in FIG. 3 are connected through VME interface units 28 to a VME type systems bus 79. The mode of operation of the VME systems bus requires that the VME interfaces 28 operate as bidirectional interfaces and that the systems bus 79 operates as a standard systems bus under control of a single bus master shown as a master CPU 81 having optional multiple distributed processors 82 and 83 which are also connected to the systems bus by bidirectional interfaces 28 and plug and receptacle units 29P and 29R respectively. In the preferred embodiment of the present invention the source and destination address which is added to the bits of data is programmable by the CPU 81 and added at the interface 57 to the input 20 bits on lines 53 to 56. Further, in the preferred embodiment of the present invention both address bits and a portion of the data bits are programmable by the CPU 81 and together comprised 24 differential bits on lines 62. The same programmable address and data bits may be passed to any of the functional elements 63 to 70 and 73 as will be described in greater detail hereinafter.

Figure 4:
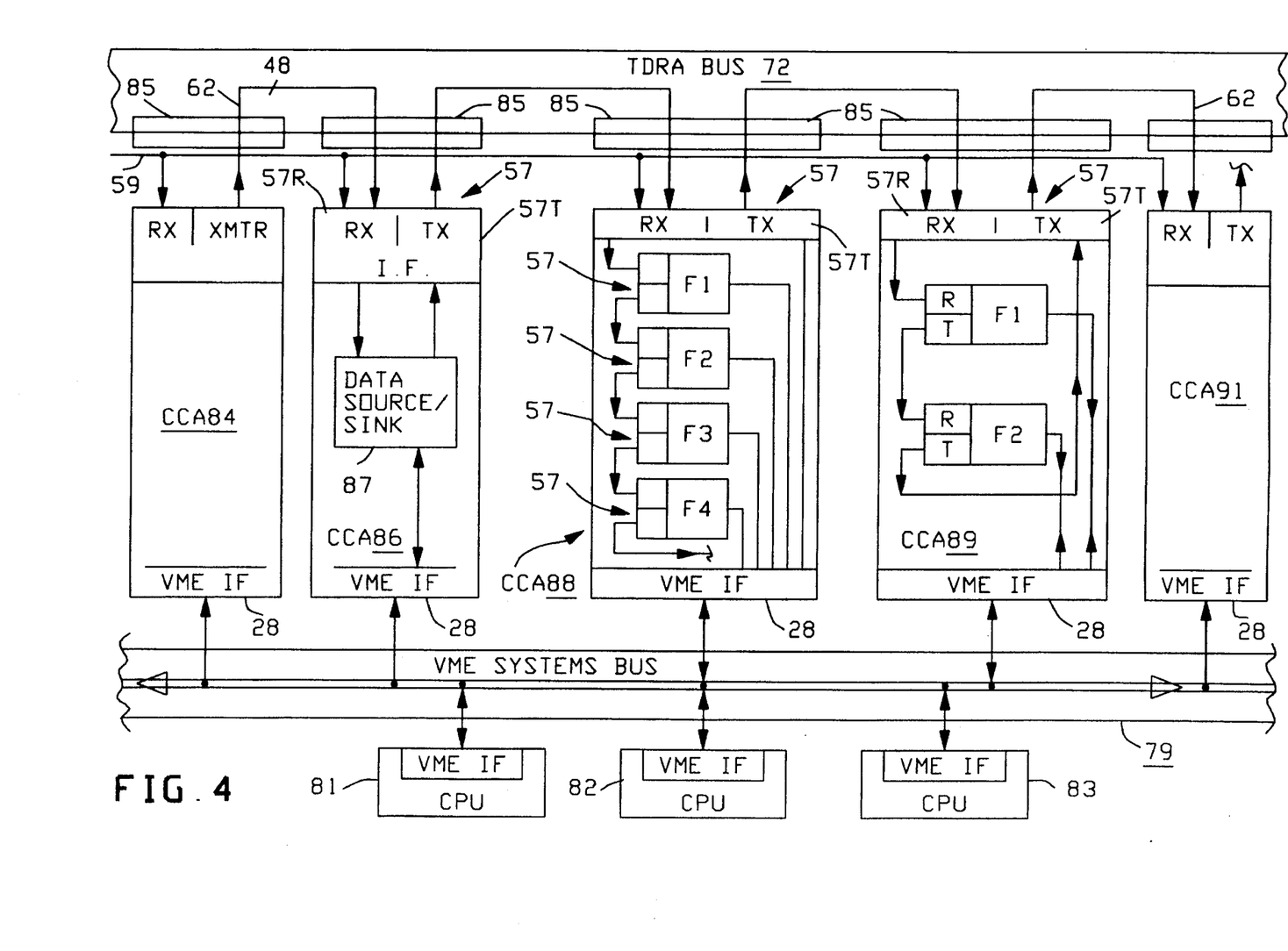
FIG. 4 is a block diagram of a modular circuit card assembly (CCA) of the type employed in the present invention high speed data processing system of FIG. 3.

Refer now to FIG. 4 showing a block diagram of the modular circuit card assemblies (CCA's) of the type preferably employed in the preferred embodiment of the present invention high speed data processing system. CCA 84 is representative of a typical data source or data source interface at the input or start of the daisy chain and provides the aforementioned 24 differential data and address bits on the first daisy chain interconnection 62. Each of the CCA's is designed to have a plug (not shown) which fits into the receptacle 85 on the TDRA bus 72. Such pin connection plugs and receptacles are standard commercially available items from such manufacturers such as AMP Corporation in Harrisburg, Pa. or Teradyne in Nashua, N.H.

CCA card 86 is shown as a single function card which provides processing of data which it receives from the bus 72 in its data sink 87. Data that is processed is transmitted back to the bus 72 through its source 87. Thus CCA card 86 depicts a single interface 57 which has a single receiver 57R and a single transmitter 57T which provides the interface to the bus 72. The data sink and source elements 87 are shown coupled through the bidirectional VME interfaces 28 to the VME systems bus 79 which permits the sink buffer registers to supply information to any system connected to the VME bus 79 and permits the same systems to provide information to the source buffer registers from the VME systems bus 79. Thus it will be understood that the CPU 81 is capable of programming the sink address for data words to be received from the TDRA bus 72 and to program the source addresses to be transmitted to and on the TDRA bus 72.

CCA 88 is shogun as a quad function CCA card which has a single plug connection interface 57 and four identical on card interfaces 57 at the input/output of each of the functional units F1 to F4. Further, each of the functional units F1 through F4 is provided with a data sink source element 87 which has a port which connects the individual source sink elements through the interface 28 to the VME systems bus 79.

CCA 89 is shown as a dual function CCA card having a single plug connectible interface 57 for connection to the TDRA bus 72. Similarly the transmitter and receivers 57T and 57R of the functional units F1 and F2 are shown being daisy chain connected to the interface 57 at the plug connection. The transmitter of the F2 function has its daisy chain reconnected to the transmitter 57T of the plug on the CCA card 89. Further, the functions F1 and F2 on the dual function CCA card 89 are shown connected through the bidirectional VME interface 28 to the systems bus 79 which permits programming of the address portion and part of the data portion of the words stored in the buffer registers of the sink and source (not shown) of the functional elements F1 and F2.

The CCA 91 is shown as a destination card which may include one or more functional elements described herein before. Ordinarily the information leaving the destination card is not passed back onto the TDRA bus 72 but is passed on to a utilization device or user via a connection 52 as shown in FIG. 3.

Having explained a source CCA card 84, a destination CCA card 91 and 3 different types of CCA cards 86, 88 and 89 it will be understood that using state of the art technology it is possible to support up to 6 functional elements on a CCA card and to incorporate the function of a source card or a destination card on one of the other types of functional element cards and still have sufficient pin connection interface to talk to other CCA cards down the bus. Since the novel TDRA bus is unidirectional if it becomes necessary to talk to a functional element upstream it is necessary to use the bypass or feedback line similar to feedback line 58 which feeds back into an input port of a functional element on one of the upstream cards. Thus, it will be understood that it is not necessary to limit the bypass line 58 to the last card on the daisy chain bus but the bypass line may be taken from an output port from any one of the functional elements on any one of the CCA cards and returned upstream to an input port of one of the functional elements on one of the other CCA cards.

In the preferred embodiment of the present invention the data source provides both high speed and low speed data. The high speed data is preferably processed by the hardware functional elements executed in high speed logic and passed on the TDRA bus 72 down to the destination CCA card 91. The low speed data is made accessible to the CPU 81 via the sink and source buffer registers 87 via the VME bidirectional interface 28. After the CPU 81 has processed the low speed data it is returned via the VME systems bus 79 to the same or another data source on one of the CCA cards. FIG. 4 clearly explains that the present invention system employing the novel TDRA bus 72 is not limited to communication with any single functional element on a CCA card. Further, the novel protocol employed with the novel TDRA bus 72 permits the functional elements to be operated in a parallel mode of operation even though they are arranged in a daisy chain which is depicted as a series connection and this mode of operation.

Figure 5:
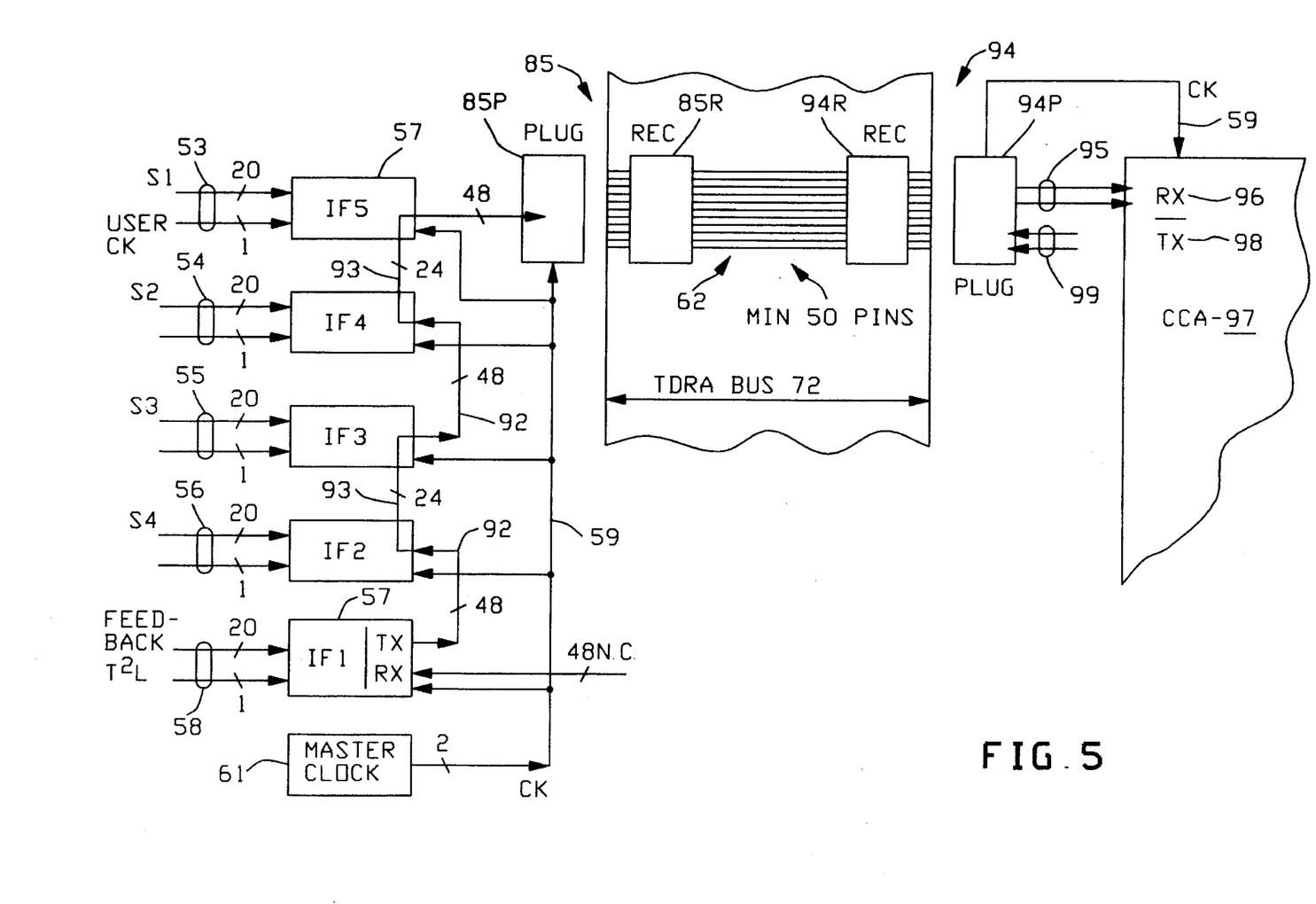
FIG. 5 is a detailed block diagram of the novel interconnection details of the functional elements of a CCA and the plug-receptacle interconnections of a CCA to the novel TDRA bus.

Refer now to FIG. 5 showing a more detailed block diagram of the interconnections between functional elements on a CCA card and the novel TDRA bus 72. For purposes of this explanation a portion of the CCA cards 50 including the five functional elements numbered 57 are shown as unique and individual functional elements 1F1 through 1F5. The feedback line 58 (also shown in FIG. 3) is shown comprising 20 single data and address bits and 1 clock bit. The bottom most functional element F1 generates internally 4 additional bits which are transmitted at the output of functional element 1F1 as 24 differential bits or 48 data bits on line 92. It will be understood that line 92 on the CCA card 50 is identical to the strip lines on the TDRA bus 72 depicted as interconnection 62. However, the internal line 93 which has 48 data bits and interconnects 2 interfaces are connections which occur internally on the same basic chip. Thus, two interface units may be provided on a single very large scale integration gate array. The daisy chain continues from the output transmitter of the interface 1F3 to the input receiver of the interface 1F4. The output receiver of interface 1F4 is shown being interconnected to the input receiver of the interface 1F5 via internal lines 93 and provided at the pins of the plug 85P which are plugged into the receptacle 85R of the connector 85. The information from the transmitter of interface 1F5 is provided on 48 of the pins of the plug 85P. Thus, there must be provided 48 strip lines to make the connection between receptacle 85R and receptacle 94R which constitute the aforementioned daisy chain interconnection 62 on the TDRA bus 72. Thus it is understood that the 48 numbered pins which connect to the transmitter of any interface IF5 connect to 48 different numbered pins at the receptacle 94R and form the input to 48 pins on plug 94P as input 95 to the receiver 96 on CCA card 97. CCA card 97 is provided with an interface unit 57 which has a transmitter 58 which also connects to 48 pins 99 which are provided in the plug 94P which reconnects the daisy chain path to the mother board by strip lines not shown. The strip lines not shown constitute an interconnection 62 which daisy chains to the next adjacent down stream CCA card. The CCA card 50 shown in FIG. 3 and described in FIG. 5 explains how four separate parallel source lines 53 to 56 are converted from a parallel input to a series input on the TDRA bus 72. In the preferred embodiment of the present invention, the source inputs S1 to S4 are operating at up to 21.5 mega words per second thus the interface at the plug 85P and on line 62 are passing data at 86 mega words per second and are capable of 172 mega words per second which represents a utilization factor of 50 percent.

Figure 6:
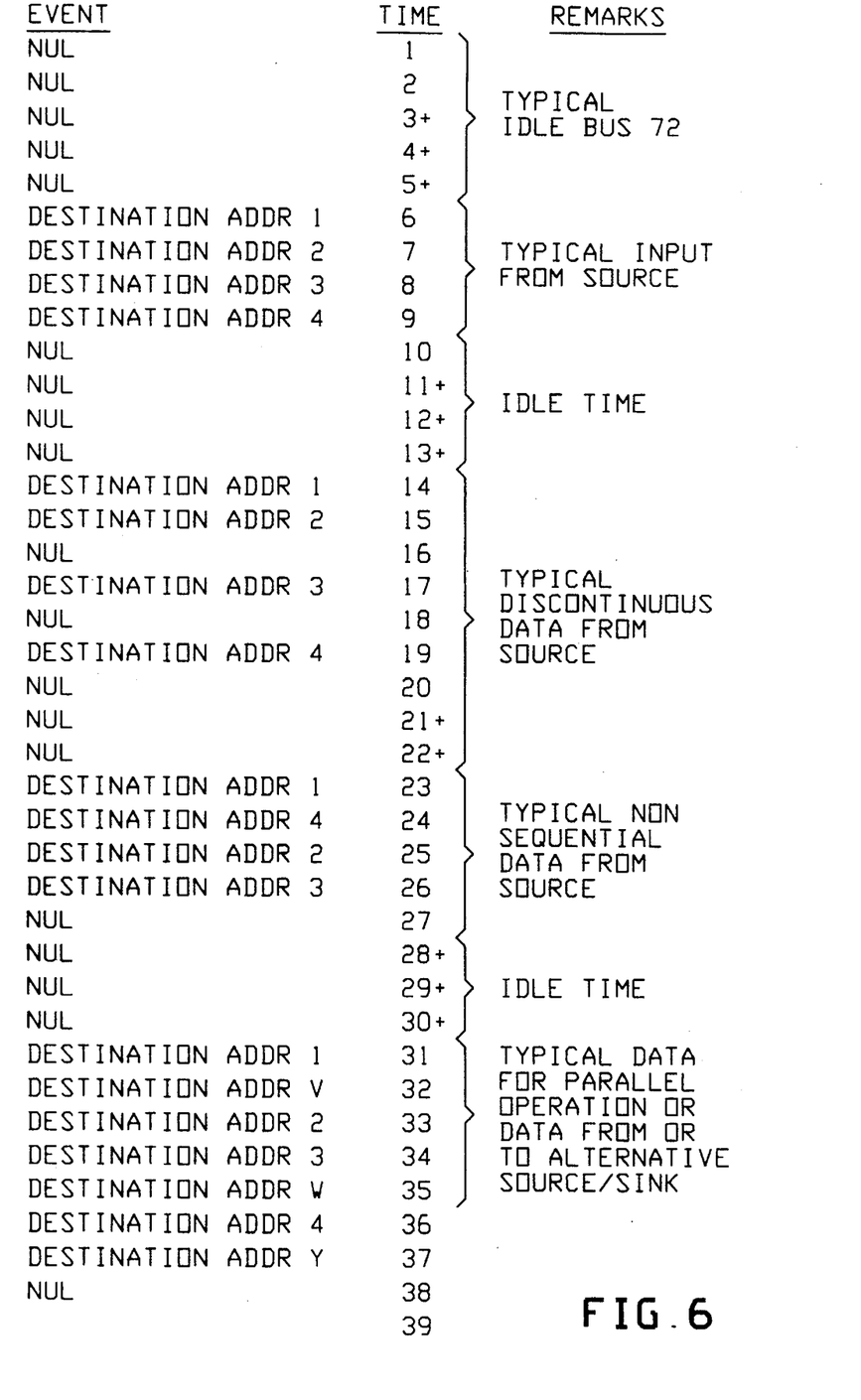
FIG. 6 is a description in table format of the typical traffic which occurs at a point on the novel TDRA bus.

Refer now to FIG. 6 showing a table employed to describe the typical traffic which occurs at a point on the daisy chain on one of the interconnect lines 62. The times T1 through T5 (T5 plus) are representative of the start-up of the TDRA bus 72 where the interface unit 57A has no receiver input thus produces a continuous stream of zeros comprising 24 differential information bits. At time T6 the high speed Demultiplexor 23 in FIG. 3 is generating information on the four source lines S1 to S4 shown as lines 53 to 56 to the interface 57 shown in FIG. 3. After receiving the 20 bits of information the interfaces 57 concatenates an address portion at the highest bits to form the 24 bit differential word. The information on lines 53 to 56 was entered in parallel and outputted in serial form on line 62 as 24 differential valid bits as shown at time sequence T6 through T9. To illustrate that the time sequence does not require a continuous entry of data, null time periods T10 through T13 plus are shown. At time T14 four more words are entered into the interface via lines 53 to 56 and are shown being entered as words during time T14, T15, T17 and T19 with interspersed nulls which further illustrates discontinuous data from the source. Time slots T23 through T26 illustrate a nonsequential data output from a continuous source input. It is not necessary that the interface units IF2 through IF5 in FIG. 5 are providing continuous addresses onto the received data as long as any data to a down stream destination to a particular address is in sequential format. Stated differently as long as the addresses at time slots T23 to T26 occur after the addresses appended at time slots T14 through T19 etc., etc. then the down steam receiver will properly receive and process the data with the address header. Time slots T27 through T30 represent another idle time similar to time slots T11 through T13. The time slots T31 through T39 represent typical data in a mix with other bus traffic; for example, addresses 1 through 4 occurring at times T31, T33, T34 and T36 would be similar to source information being distributed on the TDRA bus 72. Interspersed with the typical address information from the source is data to or from other sources such as data being supplied on the feedback bus 58 or data supplied on a feedback path (not shown) from one of the functional elements down stream. Further, the time slots T31 to T39 can represent a point on the TDRA bus 72 which is down stream from CCA cards which are producing processed data for different destinations other than the destinations being defined by the address 1 through 4.

Having explained a preferred embodiment of the present invention it will now be appreciated that various types of high speed data processing systems may be assembled by incorporating the previously described TDRA bus and the novel simplified logic interface units 57 with a plurality of functional units which may be incorporated on circuit card assemblies and inserted into receptacles which are only position dependent in the daisy chain which has been described hereinbefore. Stated differently there is no longer a need to design and manufacture a custom mother board to perform time division multiple access modes of operation when the same equivalent mode of operation can be incorporated into a time division random access mode of operation described herein before. Further, in systems which employ classical time division multiple access mode of operation using predetermined time slots, the efficiency is restricted by the lowest rate user on the TDMA bus but is not so restricted by any low rate user on the TDRA bus. It is possible to have systems operating on the TDRA bus which approach utilization factors between 50 and 100 percent mode of operation. Further, a feature of the present invention permits the designer/user to increase the clock speed for the TDRA bus once the utilization factor approaches a full capacity utilization, which will reduce the utilization factor back to a preferred range of utilization.

As another primary example, the present invention lends itself to an expansion operation when required; for example, when processing image data which requires that a series of data compression functions be included in the series daisy chain operation so that the source information meets the limitation requirements of the data length connected to the destination CCA card it is only necessary to shuffle the CCA cards down stream and insert a new CCA card having preprocessing, formatting and data compression functions before reaching the destination card CCA 91 described herein before.

Another feature of the present invention is that the insertion of additional function cards which require additional functional addresses does not require any change of address of the previously used functional cards and their functional operations.

In the preferred embodiment of an image processing system of the present invention applicants have employed the function described in U.S. Pat. No. 5,021,971 for Data Compression Of Graphic Information. The feature of the aforementioned patent permits the amount of data compression to be varied by including additional reflective binary encoding elements. Thus, by inserting function cards in series in the daisy chain and adjusting the addresses to the functional elements it is possible to adjust and increase or decrease the degree of data compression to match the data link device which is coupled to the data destination card CCA 91.

Another example of a feature of the present invention is when increasing the parallel processing capacity of a high processing system is only necessary to increase the number of functional elements placed in parallel in the daisy chain. The parallel processing capacity of the present high speed processing system is only limited by the bus master clock and the number of lines delegated for identifying addresses. In the preferred embodiment of the present invention the bus is described as having 20 data bits and 4 address bits, however, the number of addresses which are independently addressable are only limited by the address bits described in the interface units 57 and these bits may be increased as needed.

What is claimed is:

1. An improved time division random access bus system for processing large amounts of data at high speeds, comprising:

a high speed unidirectional bus structure, a plurality of receptacles on said bus structure, a plurality of parallel lines on said bus structure interconnecting the output pins on one receptacle with the input pins on an adjacent receptacle, a plurality of function circuit card assemblies connected to said receptacles of said bus structure in said bus system to form a daisy chain for performing logic functions on said data, each said circuit card assembly having a plug connection for connecting its input and output pins to said receptacles to form said daisy chain, a source circuit card assembly coupled to a source of high speed data for supplying said high speed data information having destination addresses onto said bus structure, a destination circuit card assembly for removing said information from said bus structure, and said plurality of function circuit card assemblies being connected in said daisy chain between said source circuit card assembly and said destination circuit card assembly for performing series or parallel function operations on information passed from one function circuit card assembly unidirectionally to a downstream function circuit card assembly to provide a time division random access data processing system having a data rate higher than individual function circuit card assemblies.

2. An improved time division access bus system as set forth in claim 1 which further includes output port means in said destination circuit card assembly.

3. An improved time division access bus system as set forth in claim 2 wherein said output port means includes a plurality of output ports.

4. An improved time division access bus system as set forth in claim 3 wherein the output signals from one of said plurality of output ports comprises input signals coupled to one of said upstream circuit card assemblies in said daisy chain in a feedback loop.

5. An improved time division access bus system as set forth in claim 4 wherein the output signals from another one of said plurality of output ports comprise input signals for supplying a remote utilization device such as a data link.

6. An improved time division access bus system as set forth in claim 1 wherein each said function circuit card and assembly is provided with an interface unit having a receiver and a transmitter coupled in series with the input and output pins on one receptacle of said bus structure.

7. An improved time division access bus system as set forth in claim 6 wherein each said circuit card assembly is provided with an interface unit for coupling said circuit card assembly to said bus structure.

8. An improved time division access bus system as set forth in claim 6 wherein each said function circuit card assembly is provided functional units coupled between said receiver and said transmitter of said interface unit.

9. An improved time division access bus system as set forth in claim 8 which further includes a second interface unit coupled to said functional units for providing access to a conventional system bus.

10. An improved time division access bus system as set forth in claim 1 wherein more than one of said circuit card assemblies is provided with a plurality of interface units on said circuit card assembly connected in a daisy chain for performing plural individual data processing functions.

11. A method of providing time division access to a bus systems comprising the steps of:

providing a high speed unidirectional bus having a plurality of parallel lines thereon inconnecting input and output pins on receptacles on said bus, making a source circuit card assembly having its output pins coincident with the input pins of a receptacle, making a destination circuit card assembly having its input pins coincident with output pins of a receptacle, making a plurality of function card assemblies each having its input and output pins coincident with output and input pins of a receptacle, connecting said function card assemblies to said unidirectional bus between said source circuit card assembly and said destination circuit card assembly in series a daisy chain, programming address information onto data supplied by said source circuit card assembly to said function circuit card assemblies so that the data information supplied by said source circuit card assemblies is directed to unique ones of said function circuit card assemblies for processing, processing said data information in said unique function circuit card assembly and directing said processed data information to a downstream circuit card assembly, whereby a time division random access bus system is provided by arranging function circuit card assemblies in an ordered daisy chain sequence between a source circuit card assembly and a destination circuit card assembly with out any modification of the bus structure.

12. The method as set forth in claim 11 which further includes the step of providing a feedback path from said destination circuit card assembly to an upstream circuit card assembly.

13. The method as set forth in claim 12 wherein said upstream circuit card assembly comprises said source circuit card assembly and the step of providing a feedback path comprises providing said feedback path on said unidirectional bus.

* * * * *